Patented Mar. 5, 1935

1,993,140

UNITED STATES PATENT OFFICE 1,993,140

PROCESS FOR REFINING HYDROCARBON OILS FOR REMOVING SULPHUR COMPOUNDS

Walter G. Hamilton, Ralph Gwin Follis, and Howard P. McCormick, El Paso, Tex., assignors to Standard Oil Company of California, San Francisco, Calif., a corporation of Delaware No Drawing. Application January 3, 1930, Serial No. 418,402

4 Claims. (Cl. 196—33)

This invention relates to the treatment of hydrocarbon oils for the purpose of removing objectionable sulphur compounds and the recovery of elementary sulphur.

Objectionable sulphur compounds are removed from petroleum oils generally by the so-called "doctor treatment". In the doctor treatment of petroleum oils the oils are sweetened by agitation with caustic soda solution containing litharge (sodium plumbite). The sodium plumbite of the doctor solution forms certain mercaptides which are precipitated by elementary sulphur, stabilizing all sulphur compounds in the oil. When petroleum oil does not contain sufficient elementary sulphur for this reaction, additional sulphur must be added in the doctor treatment to precipitate the oil soluble or suspended reaction products.

A considerable number of petroleum oils contain hydrogen sulphide before treatment. Moreover, in the acid treatment of petroleum oils there is a certain amount of sulphur dioxide produced.

It is the general object of the present invention to make use of the hydrogen sulphide naturally in petroleum oil in connection with sulphur dioxide for the purpose of forming elementary sulphur in the oil in the form where it will be available for the doctor reaction.

More specifically, the general object of the present invention is to provide a method of sweetening oils containing hydrogen sulphide by the doctor method by which the requirement for free sulphur from outside sources is materially reduced or entirely eliminated.

Another object of the present invention is to provide a method of producing elementary sulphur in oils from oils containing hydrogen sulphide.

We have discovered that when hydrocarbon oils such as crude gasoline which contain hydrogen sulphide are treated with sulphur dioxide either as a gas or sulphur dioxide dissolved in water (sulphurous acid) a reaction takes place between the sulphur dioxide and the hydrogen sulphide in the presence of the oil forming elementary sulphur. The reaction which is believed to take place in producing the elementary sulphur is as follows:

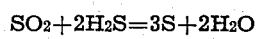
$$SO_2 + 2H_2S = 3S + 2H_2O$$

An economical source of the sulphur dioxide for use in conducting this reaction is wash water such as is obtained following the acid treatment of oils. In acid treating petroleum oils a material part of the sulphuric acid employed is decomposed into sulphur dioxide gas. This sulphur dioxide gas remains dissolved in the oil when the sulphuric acid is removed. When wash water is applied to the oil, this sulphur dioxide is extracted therefrom and remains in the wash water. In this form the sulphur dioxide and wash water are ordinarily discarded. By using this wash water to contact with the crude gasoline, the sulphur dioxide otherwise wasted and the hydrogen sulphide content of the oil react together forming elementary sulphur, as explained by the above reaction. While a considerable portion of the free sulphur thus produced is drawn off with the water introduced as a sulphur dioxide solution, a small portion of the free sulphur ordinarily remains in the oil and such sulphur is sufficient to function in the ordinary doctor or plumbite treatment for the removal of objectionable sulphur bodies in the oil. The remainder of the sulphur which is drawn off with the water solution may be recovered if desired, particularly when the quantity warrants, and can be used for various purposes.

After the treatment of oil with the sulphur dioxide for formation of elementary sulphur, the oil may then be treated in any desired manner. In the preferred form of our process we treat crude gasoline stock after the sulphur dioxide treatment mixing with sulphuric acid in the well-known manner, and drawing off the resultant sludge. The oil is then water-washed, which water washing serves to remove the sulphur dioxide resulting from the acid treatment. This sulphur dioxide wash water is suitable for treating oil containing hydrogen sulphide as previously described. The process thus in part is a cyclic one in which wash water from previous treatments of acid treated gasoline stock is recycled back to treat further untreated crude gasoline stock containing hydrogen sulphide.

The oil is finally given a doctor treatment, that is to say, it is subjected to the action of litharge in caustic solution (sodium plumbite) and the products of reaction are drawn off leaving a sweet gasoline, free from objectionable sulphur compounds.

Ordinarily, there is sufficient free sulphur carried along with the oil to make the addition of any further sulphur in the doctor treatment unnecessary; however, if there should be insufficient precipitated mercaptides produced in the reaction, additional sulphur may be added in the usual way. For the purpose of such addition of sulphur in case it is desired any source may be used, however, we prefer to employ the free sulphur formed in the wash water when the same is contacted with the crude gasoline containing the hydrogen sulphide above described. When this wash water is withdrawn from the crude gasoline, only a part of the elementary sulphur formed remains in the gasoline, as previously pointed out, so that in the wash water there is available a material additional quantity of elementary sulphur which can be used to break the sulphur compounds formed in the doctor reaction.

It, however, has been found rarely necessary to employ additional sulphur in carrying out the process of this invention on oils containing hydrogen sulphide in appreciable amounts and in any event, the sulphur requirement following the doctor treatment of such oils is either entirely eliminated or materially reduced.

We have also found that the amount of sulphur which will remain in the oil after the sulphur dioxide treatment is capable of control by varying the concentration of sulphur dioxide solution or by following the sulphur dioxide treatment with a separate water wash. Also, in case too much sulphur is formed, the amount of hydrogen sulphide in the oil processed may be reduced or varied by a preliminary treatment with caustic soda so that when the oil is subsequently contacted with the sulphur dioxide solution there will not be an excessive amount of elementary sulphur formed.

In practice it has been found advisable to retain somewhat less free sulphur in the oil than the minimum required for the doctor treatment, making up the full requirement by adding after the doctor treatment some of the excess sulphur previously removed. In this manner a safeguard against an excess sulphur being present is established.

It is also found that the reaction between hydrogen sulphide and sulphur dioxide in the presence of a crude gasoline is facilitated by air blowing the oil undergoing treatment. Probably the air blowing oxidizes a portion of the hydrogen sulphide to free water and free sulphur and serves somewhat to reduce the requirement of sulphur dioxide.

It has also been found that when air blowing is employed, it is possible to exercise more complete control over the amount of free sulphur left in the oil, even to such extent that in certain cases the doctor treatment may be dispensed with and a non-corrosive oil produced. We thus desire to point out that the treatment herein described of petroleum oils containing hydrogen sulphide with wash water containing sulphur dioxide or other form of sulphur dioxide is of an advantage whether or not the oil is to be later subjected to the doctor treatment. The greater the quantity of air employed the less free sulphur will be left in the oil. The hydrogen sulphide is removed, however, and elementary sulphur produced which appears to be for the greater part removed by the wash water.

While the process of the present invention has been described as treating gasoline containing hydrogen sulphide with sulphur dioxide in water solution it should be understood that the invention is applicable to other oils containing hydrogen sulphide wherein the hydrogen sulphide is reacted upon by sulphur dioxide. Moreover, the invention is not necessarily confined to the treatment of liquids but is applicable to gases containing hydrogen sulphide wherein the gases are contacted with sulphur dioxide in gaseous or liquid form or in solution.

The examples herein illustrated are for the purpose of explaining a preferred form of the invention and the invention is not limited to the example given, but includes all such changes and modifications as come within the scope of the appended claims.

We claim:

1. A process of treating hydrocarbon oils containing hydrogen sulphide, which process comprises agitating the oils with a dilute aqueous solution of sulphur dioxide, said aqueous solution being capable of converting the hydrogen sulphide content of the oils into elementary sulphur, the aqueous solution being free of sulphuric acid or other chemicals in sufficient concentration to effect any treatment of the hydrocarbon constituents of the oils, separating the aqueous solution from the hydrocarbon oil, and adding the aqueous solution to hydrocarbon oil which has been treated with sodium plumbite for precipitating the sulphur compounds in the oil resulting from the plumbite treatment.

2. A process of treating hydrocarbon oils containing dissolved hydrogen sulphide, which comprises removing a part of the dissolved hydrogen sulphide by treatment with aqueous alkali, agitating the hydrocarbon oil remaining with sulphur dioxide in order to produce elementary sulphur, part of which remains in solution in the oil while blowing with an oxygen containing gas, separating a part at least of the produced elementary sulphur, and treating the hydrocarbon oil with plumbite solution to effect a sweetening reaction.

3. A process of treating hydrocarbon oils containing dissolved hydrogen sulphide, which comprises, agitating the hydrocarbon oil with sulphur dioxide in order to produce elementary sulphur, part of which remains in solution in the oil, separating a part at least of the produced elementary sulphur, and treating the hydrocarbon oil with plumbite solution to effect a sweetening reaction without adding additional elementary sulphur.

4. A process of treating hydrocarbon oils containing dissolved hydrogen sulphide, which comprises agitating the hydrocarbon oil with sulphur dioxide in order to produce elementary sulphur, part of which remains in solution in the oil, separating a part at least of the water-wetted elementary sulphur produced, treating the hydrocarbon oil with plumbite solution to effect a sweetening reaction, and completing the sweetening reaction by the addition of the elementary sulphur removed from said hydrocarbon oil.

WALTER G. HAMILTON.
RALPH GWIN FOLLIS.
HOWARD P. McCORMICK.